United States Patent [19]

Kiesel et al.

[11] 4,178,050

[45] Dec. 11, 1979

[54] MANUFACTURE OF HALOGEN CYCLE INCANDESCENT LAMPS

[75] Inventors: Rolf Kiesel, Königsbronn; Gerhard Maier, Herbrechtingen; Helmut Grahmann, Friedberg, all of Fed. Rep. of Germany

[73] Assignee: Patent-Treuhand-Gesellschaft fur Elektrische Gluhlampen mbH, Munich, Fed. Rep. of Germany

[21] Appl. No.: 869,494

[22] Filed: Jan. 16, 1978

Related U.S. Application Data

[63] Continuation-in-part of Ser. No. 755,189, Dec. 29, 1976, abandoned.

[30] Foreign Application Priority Data

Jul. 16, 1977 [DE] Fed. Rep. of Germany ....... 2601576

[51] Int. Cl.$^2$ ......................... H01J 9/18; C03C 27/02

[52] U.S. Cl. ..................................... 316/19; 65/59 A; 316/20

[58] Field of Search ....................... 316/19, 20, 17, 18; 313/220, 271, 315, 221; 65/59 A; 29/25.15, 25.16, 469.5

[56] References Cited

U.S. PATENT DOCUMENTS

| | | | |
|---|---|---|---|
| 3,113,010 | 12/1963 | Willis et al. | 65/59 A |
| 3,270,237 | 8/1966 | Danko | 313/315 X |
| 3,275,879 | 9/1966 | Demarest et al. | 313/220 X |
| 3,466,489 | 9/1969 | Audesse et al. | 313/315 X |
| 3,475,641 | 10/1969 | Ayres | 313/271 |
| 3,494,756 | 2/1970 | Damm | 65/59 A |
| 3,743,375 | 7/1973 | De Fraeye | 316/20 |

OTHER PUBLICATIONS

*Glass to Metal Seals,* by Partridge, pp. 1, 2, 102–104, 145, 148 & 149, 1949.

*Primary Examiner*—William R. Briggs
*Attorney, Agent, or Firm*—Frishauf, Holtz, Goodman & Woodward

[57] ABSTRACT

To permit the use of hard glass rather than silica or quartz glass, a bulb of hard glass is drawn from a length of hard glass tubing, the exhaust tube being molded on adjacent the rounded-off bulb. A mount assembly composed of filaments and two or more lead-in wires is pinch-sealed into the bulb such that pre-oxidized portions of the lead-in wires come to lie within the pinch seal. The pinch seal is rendered vacuum-tight and shaped in separate steps including repeated heating to fuse the wires to the glass and to shape the pinch seal. Subsequent to filling with inert gas, the lamp manufacture is terminated by tipping off the exhaust tube.

8 Claims, 11 Drawing Figures

MANUFACTURE OF HALOGEN CYCLE INCANDESCENT LAMPS

Figure 1A:
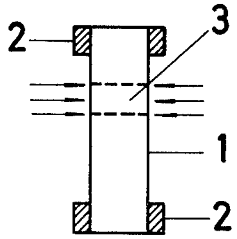

This application in a continuation-in-part of my earlier application U.S. Ser. No. 755,189, filed Dec. 29, 1976, now abandoned.

BACKGROUND OF THE INVENTION

The present invention relates to a method of manufacturing halogen cycle incandescent lamps, and more particularly multifilament lamps for use in automotive applications.

It was customary to use fused silica or quartz glass for the bulb of this type of halogen cycle lamp. This required complex processing, especially as regards the achievement of hermetic glass-to-metal seals. Due to the cost involved, the use of hard glass for halogen cycle incandescent lamps became of interest, for the price of hard glass compared with the price of fused silica is lower not only for the material as such but also for its processing, last but not least because it permits lower processing temperatures. Hard glass compositions are borosilicate compositions having a mean coefficient of linear thermal expansion between 0°to 300° C. $\times 10^{-7}$ per °C. ($\alpha$), ranging from 30 to 50 and having an annealing point above 500° C. The previously used manufacturing sequences were found to be inapplicable to hard glass as the bulb material for halogen cycle incandescent lamps. Hard glass, moreover, permits new structural designs.

It is the object of the present invention to provide a suitable method of economic manufacture of halogen cycle incandescent lamps provided with bulbs of hard glass.

Subject Matter of the Present Invention

A bulb with a rounded-off bowl and integrally formed exhaust tube is shaped from a length of hard glass tubing, the ends of which are placed in clamps and are drawn apart after a respective section of the length of tubing has been heated. The transition area between bulb bowl and exhaust tube is additionally constricted in a second processing step. A subassembly of a mount of one or more individually connectible filaments, two or more lead-in wires, preferably having preoxidized portions and, if required, metal shielding caps, is then pinch-sealed into the bulb, sealing being effected so that the preferably preoxidized portions of the lead wires are positioned within the pinch seal area. The pinch seal is then subjected to additional heating, and additionally subjected to another pinching-and-forming or molding operation. The lamp is finished by filling with inert gas, such as nitrogen, argon, krypton, or xenon, with halogen additive, and then tipping off the exhaust tube.

Alternatively, the lead wires with their preoxidized portions are preassembled by sealing them into a bead member of hard glass which, together with the wires, is then pinch-sealed into the bulb of another hard glass having a higher transformation temperature. The pinch seal is heated again to obtain a hermetic seal between the bead member of hard glass and the bulb of hard glass.

The transformation point of the bead member of hard glass is lower than the transformation point of the bulb material so that sealing of the lead wires into the bead member of hard glass is possible at a lower temperature than when sealing them directly into the bulb. During the succeeding pinching operation, heating of the hard glass of the bulb is not required to the same extent as when sealing the lead wires directly into the bulb. During heating of the bulb to form the pinch seal, around the bead member, the above-mentioned hermetic seal is established between the hard glass bead member and hard glass bulb without any noticeable deformation of the pinch seal. For stabilization of the mount into a discrete subassembly, bonding of the lead wires to a wire bridge, e.g. by welding, is possible. This bridge is provided externally of the sealing area and is removed when the pinch seal has been established.

Figure 1B:
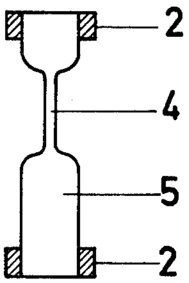
Figure 1C:
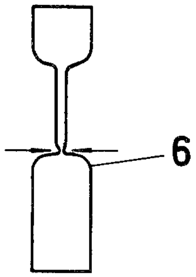
Figure 2A:
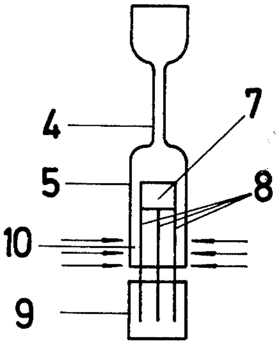
Figure 2B:
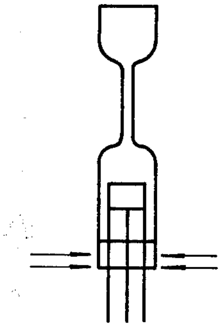
Figure 2C:
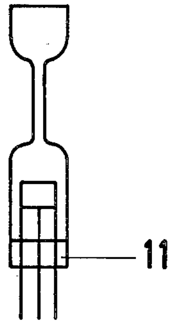
Figure 3A:
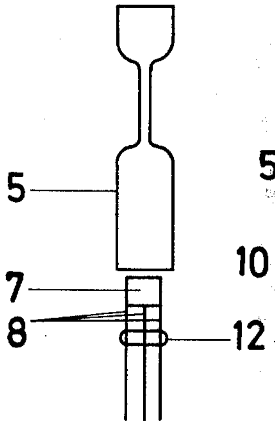
Figure 3B:
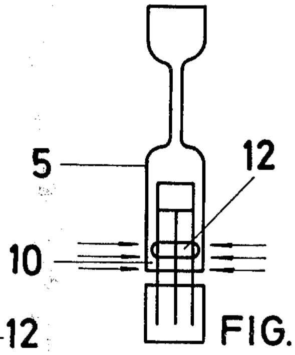
Figure 3C:
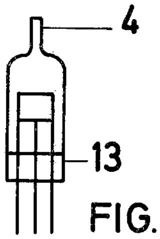
Figure 4A:
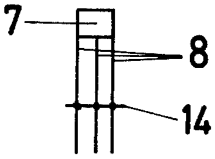
Figure 4B:
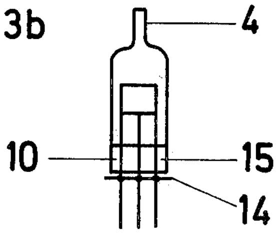

The invention will be described by way of example, with reference to the accompanying drawings, wherein:

FIGS. 1*a*, 1*b*, 1*c*; 2*a*, 2*b*, 2*c*; 3*a*, 3*b* and 3*c* are highly schematic side views of sequential steps in the process of manufacturing the lamp, FIGS. 1*a* to 1*c* illustrating sequential steps in the drawing of the tubing to form the bulb, FIGS. 2*a* to 2*c* illustrating the introduction and sealing of the filament assembly, FIGS. 3*a* to 3*c* illustrating a modification of the steps shown also in FIGS. 2*a* to 2*c*; and FIGS. 4*a* and 4*b* illustrate, schematically in side view, another embodiment of a subassembly of the filaments and a portion of the sequential steps of making the lamp when using the modified subassembly.

As is to be seen from FIGS. 1*a* to 1*c*, a length of hard glass tubing 1 is seized at the top and bottom end by clamps 2 and heated in area 3. Then, the tube length is drawn apart by means of the clamps 2 thus forming in the heated area 3 bulb bowl 6 and an exhaust tube 4 of reduced diameter. In the transition area between bulb bowl 6 and exhaust tube 4 there is formed subsequent to reheating a constricted extension of the exhaust tube. As next seen in FIGS. 2*a* to 2*c*, a mount, composed of one or more tungsten filaments 7 and two or more lead wires 8 of tungsten or molybdenum, supported in a holder 9, is inserted in the bulb 5 thus formed. The bulb 5 is hermetically sealed in area 10, as schematically shown by the arrows, to the lead wires to form a pinch seal 11. In order to increase the vacuum-tightness of the seal, lead wires 8 in area 10 preferably are preoxidized.

As is to be seen from FIGS. 3*a* to 3*c*, it is likewise possible to form a subassembly of the lead wires 8 sealed to a hard glass member 12 which is designed as a bead or bridge. The bead or bridge uses a hard glass material which has a lower transformation point than the hard glass of which the bulb is made. The use of a hard glass for the bead having a transformation point which is 100° C. lower than the transformation point of the hard glass of the bulb proved particularly suited for instance, glass No. 713 manufactured by OSRAM GmbH, Munich and Berlin, with a transformation point of 530° C. for the bead, and glass No. 942,742 manufactured by OSRAM GmbH, Schott 8409 or Corning 1720, with a transformation point of about 700–750° C. for the bulb. Within the temperature range of from 250 to 300° C., the expansion coefficient is (44.5 to 53)$\times 10^{-7}$ and is thus adapted to the coefficient of tungsten or molybdenum. When sealing the lead wires 8 into the hard glass bead 12, it is possible to use a lower temperature than when directly sealing the leads into the bulb. The mount provided as a subassembly with the hard glass member 12 is introduced into the bulb 5 (FIG. 3*b*), bulb 5 is heated in region 10 and pinch-sealed around bead 12. To ensure reliable vacuum-tightness, the formed pinch seal 13 is again heated to the processing temperature of the bead glass. The pinch seal temperature for the bulb material may be lower than in case of direct sealing of the bulb.

When using the direct insertion (FIGS. 2a–2c), glass No. 942, manufactured by OSRAM GmbH, is suitable. The glass for the bulb is first heated to a temperature of from 1350° to 1450° C. and pinch-sealed around the preoxidized portions of the wires. This wets the wires by the glass; glass and oxide merge into each other. The high temperature causes melting to an extent that the pinch zone or region is deformed. The cooling effect resulting from the fusion of the glass with the wire is compensated by heating the pinch seal again to form 1100° to 1200° C. At this temperature the pinch seal is once more subjected to a pinching operation which is a mold-pinching operation to provide the pinch zone with the desired shape. Thereafter, forced cooling to 800° C. is effected by pressurized air within 11.9 sec. and, subsequently, retarded cooling from 800° C. to 650° C. within 32.5 sec.

When using a glass bead (FIGS. 3a–3c), the bulb is heated together with the inserted subassembly, i.e. bead 12, into which the wires 8 have already been fused, to a temperature of from 1100° to 1200° C. and both, bulb and bead are sealed by pinching which may include mold-pinching to simultaneously seal the bead and shape the pinch seal. After forced cooling to 800° C., there follows retarded cooling to 500° C. The glass used for the bead was glass No. 713, the glass used for the bulb was glass No. 942, both manufactured by OSRAM. The temperature to which the bulb is heated when forming the pinch seal with the glass bead is less than the temperature needed to provide for fusion of the bulb with the oxidized wires (FIGS. 2a–2c) and thus the hermetic seal of the bulb to the bead can be done at a temperature which does not result in deformation of the bulb area in the region of the pinch seal, so that molding or mold-forming during pinching, or a separate mold-pinching is not required. If the respective temperatures of the glasses are such, however, that the bulb will deform, then mold-pinching may be necessary.

In order to stabilize the mount formed by filaments 7 and lead wires 8, the lead wires 8 can be welded to a metal wire bridge 14 (FIGS. 4a, 4b). The wire bridge 14 is so arranged that it will be outside of the pinch seal 15 after the wires have been sealed in the pinch seal. It can then be removed.

The lamps manufactured in this way are filled in conventional manner with inert gas such as nitrogen, argon, krypton, or xenon, with halogen additive and are closed by tipping off the exhaust tube 4.

The present invention is particularly suitable to make halogen lamps for use in automotive headlights, in which two separately switchable incandescent filaments are used, respectively for "high beam" and "low beam". The invention is particularly appropriate for automatic manufacture of such lamps, in which rotary or turret-type lamp manufacturing machines are used. Such machines have a plurality of work stations, arranged around the circumference of a circle, at which the respective elements or parts are worked on.

The quantity of glass which has to be heated for lamps suitable for automotive headlight applications, for example, is in the order of 2 to 2.5 grams. The space available to heat this quantity of hard glass to the requisite temperatures is limited. Hard glass requires substantially higher working temperatures than soft glass. Yet, hard glass is required for such lamps and to permit the insertion of wires to hold the filament assembly, rather than of connecting foils.

When heating a quantity of hard glass in such an automatic machine, it must be heated essentially entirelly through and through to the working temperature. At that temperature, the glass will have a viscosity of approximately $10^{+4}$ poise. The glass is now deformable but is not yet at the temperature at which it will fuse to oxidized wires placed therein (FIGS. 2a–2c). This deformable, but not yet fusing glass, that is, the glass which will not yet wet the oxidized wire, is then, after preliminary pinch-sealing the glass around the wires, heated again at a subsequent station to the next higher temperature. The subsequent heating is done to permit movement of the glass with the preassembled wires therein to a next subsequent heating station. At that subsequent heating station, only that portion of the glass which is to fuse to the wires is heated to the higher, or fusion, temperature, of about, for example 1350° to 1450° C. Upon fusion, the glass will cool. The glass heated to that temperature will, however, begin to deform from the prior shape which it has received when the wires were first inserted through the glass tube. A vacuum-tight connection has been formed, but the shape of the connection is unsuitable for use in a socket, particularly for automatic insertion into sockets. Thus, a further pinching step, referred to as mold-pinching, is carried out so that the glass will again receive the outer shape which is desired. This will require that the glass will be at a temperature where it can readily be deformed. Since the glass has cooled due to the fusion of the glass with the wire, a reheating to deformation temperature, that is, of about 1100° to 1200° C., is desirable. The reheating and pinch-molding the pinch seal are carried out at subsequent working stations on a rotary or turret machine.

The arrangement permits introduction of three wires into the bulb. Introduction of three wires has the effect, during sealing, that more heat is removed than if only two wires are used. The coefficient of expansion of the wires is practically the same as that of the glass, and they are located in a row, next to each other, in parallel. The pinch seal is approximately rectangular and has a width of about 15 mm, a height of about 11 mm, and the thickness of the pinch seal will be about 4 mm. The glass tube is preferably held in vertical position, with a portion of the tube corresponding to the zone or region which will then form the pinch seal being subjected to heating and pinch-sealing or deformation at the respective working stations. The tube is also drawn to form the bulb (FIGS. 1a–1c) in the same machine, by heating the tube and pinching it off. Evacuation and filling of the filler or inert gas can be carried out at the same time.

Vacuum-tight insertion of the glass by melting thereof, that is, by fusing the glass to the wires, requires intimate penetration of wire and glass. This is obtained by preoxidizing the portion of the current carrying wire to generate an oxide layer thereon. The surrounding portions of the glass which must fuse to the wires must be at a temperature which permits wetting the wires by the glass. To permit wetting by the glass, the glass itself must have an appropriate flow characteristic. In practice, this means that it must be heated to a comparatively high temperature. Customary circular or turret-type lamp manufacturing machines usually have a plurality of working positions on which gas flames are located which, in controlled manner, heat the respective tubular portion of the glass around its circumference, as uniformly as possible, until the glass has the desired temperature at which it will wet the wires being inserted. After heating of the glass, it is brought into intimate contact with the wire to be melted thereto by a pinching tool which, at the same time, also shapes the pinch seal, so that it will have the desired external form or shape. In the manufacture of many types of lamps, a single sealing and pinching step may suffice. For the manufacture of halogen cycle incandescent lamps, however, such a single sealing step is usually not sufficient due to the high temperature requirements of the hard glass to be used in the bulb, and the quantity of glass required to be heated.

To permit automatic manufacture of halogen cycle incandescent lamps of the type particularly suited in automotive headlight applications, and particularly to permit rapid operation of such automatic machines, so that the number of elements per hour being made thereon is high, it is necessary to reduce the dwell time of the respective assemblies or subassemblies at the respective working station. The number of working stations, of course, is limited and will depend on the diameter of the machine. This number cannot be extended at random while keeping the machine at a reasonable size. Heating the glass to the high temperature in very short time up to the wetting temperature of the glass with the wire results in deformation of the glass tube which has the tendency to become rounded or drop-shaped. There is a very high temperature gradient between the outside of the glass and the region where the glass will contact the current carrying conductors or wires. A high supply of heat per unit time is necessary. This would require, in turn, working with a hot flame. Increasing the heat of the flame is not possible, however, beyond a predetermined limit since, then, the glass will be damaged, for example will have the tendency to form bubbles. Too rapid heating of the glass can be prevented by increasing the dwell time of the glass at the various working stations—undesirable, however, from a production point of view. Installing additional heating stations is also undesirable because the temperature of the glass is difficult to control and, due to gravity, the glass may be subject to form drops which will drop off from the pinch zone or region, before the actual pinching working position of the machine has been reached.

Sequential heating of the glass in two steps—either directly in the tube, or by using a glass bead which is used as a preliminary insertion step permits use of customary and available circular bulb-making machines having the customary number of heater positions and the usual heat power output without increasing the dwell time at any one heating position to an undesirable duration.

In accordance with the method, the portion of the tube which will form the pinch zone or region is heated initially throughout its circumference as uniformly as possible, for example at successive heating positions. The width of this zone is about 6 to 8 mm, in the example above indicated. It is heated, not to melting temperature, however, but only to a working temperature, that is, until the glass will have the viscosity of about $10^{+4}$ poise. Thus, the glass is not yet heated to the range at which it will wet the wire. It is plastic, however, and is then pinch-sealed to the wire. This is a first pinching step. The pinch will surround, mechanically, the lead wires without, however, at this stage wetting the lead wires, that is, being fused thereto. The engagement between glass and lead wires is as close as possible. When the pinch tool has been withdrawn from the pinch region or pinch zone where the pinch was preliminarily formed, only localized heating is carried out. In a preferred form, the heating is so localized that only those portions of the glass which are immediately adjacent the wires are heated to fusion temperature, that is, to liquefaction. When those portions of the glass are heated to liquefaction temperature, the glass will fuse with the wire. It has already, previously, been placed around the wire in engagement therewith. Upon reaching wetting temperature, an intimate merging of the glass with the oxide layer will result so that the desired vacuum-tight fusion will be obtained. A second pinching step is then carried out—see FIG. 2*b* or FIG. 3*b*. In the embodiment described in connection with FIGS. 2*a*–2*c*, the second pinching step is not used to improve the tightness of the seal. The seal has already been formed when the glass was melted and fused with the wire. The glass, rather, is pinch-molded so that the pinch seal 11 will have the desired external shape which it is to retain after the lamp has been made, but which was lost due to the reheating after the initial pinching operation (FIG. 2*a*) upon subsequent heating of the glass to fusion temperature.

In the embodiment of FIG. 3, the initial heating to fusion temperature is carried out at the time the subassembly of the wires 8 with the bead 12 is made. The temperature at that stage will depend on the type of glass used for the bead 12. Heating and pinching of the tube to the bead 12 then is a second, subsequent heating step which, however, may not require pinch-molding since the temperature to which the tube has to be heated can be less than that at which fusion to the wires themselves is needed. Thus, the second pinching step is used to seal the bead 12 to the pinch seal zone of the tube 5.

Various changes and modifications may be made within the scope of the inventive concept.

We claim:

1. Method of manufacturing a halogen cycle incandescent lamp having a bulb of hard glass and lead-in wires passing thereinto through a pinch seal comprising, in accordance with the invention, the steps of providing a length of hard glass tubing (1);

clamping the ends of the hard glass tubing length in clamps (2), heating the tubing intermediate the clamps and drawing apart the hard glass tubing to shape a bulb (5) with a rounded-off bowl (6) and an integrally formed exhaust tube (4);

providing a mount comprising one or more individually connectible filaments (7) and two or more lead-in wires (8);

said mount with the wires being introduced into the bulb (5) with the lead-in wires extending through the open portion of the tubing forming the bulb at the end remote from the exhaust tube;

heating a portion of the bulb through which the mount has been introduced and containing a quantity of about two or more grams of glass substantially uniformly about its circumference to a working temperature at which the glass will soften to a viscosity of approximately $10^{+4}$ poise, said temperature being sufficient to render the glass plastic but below the temperature at which the glass will wet the lead-in wires;

pinching the heated glass to surround the lead-in wires mechanically in close engagement to form an initial mechanical connection between the mount and said wires and the thus pinched bulb and to provide a preliminary pinch portion;

withdrawing the pinch tool from the pinched region;

heating the thus pinched region by heating at least those portions of the pinched glass which are immediately adjacent the wires to liquefaction temperature and fusion with the wires to effect wetting of the glass immediately adjacent the wire and intimate merger of the surface of the wire with the glass to form a vacuum tight fusion seal;

then, after the vacuum tight fusion seal is obtained, mold pinching the initially pinched and reheated, fused region in a pinched-mold to mold the pinch region to a desired external shape which is to be retained after the lamp has been made to re-fashion the external shape of the lamp after the heating-to-fusion step; and finishing the lamp by filling the lamp with an inert gas through the exhaust tube (4) and tipping off the exhaust tube.

2. Method according to claim 1, further comprising the step of additionally constricting the transition area between the bulb bowl (6) and the exhaust tube (4) in a separate processing step sequential to drawing apart the length of tubing to form the bulb (5) and the exhaust tube (4).

3. Method according to claim 1, wherein the lead-in wires (8) are formed with pre-oxidized portions intermediate their length;

said pre-oxidized portions being positioned to lie within the pinch seal area (10) and pinch-sealing being effected to pinch seal the heated hard glass tubing around said pre-oxidized portions.

4. Method according to claim 1, wherein the finishing step comprises filling the bulb with a gas filling comprising at least one of the materials selected from the group of: nitrogen, argon, krypton, xenon; said material including a halogen additive.

5. Method according to claim 1 wherein the quantity of hard glass is formed by a hard glass bead (12) having a transformation point lower than that of the bulb material;

wherein the step of introducing the mount into the bulb comprises introducing the mount with the hard glass bead into the bulb through a distance such that the hard glass bead (12) is positioned in the region of the pinch seal area (10);

and wherein the heating to fusion temperature and mold pinching steps comprise sealing the hard glass bead (12) together with the lead-in wires sealed therein into the hard glass bulb (5).

6. Method according to claim 5, wherein the lead-in wires (8) are formed with pre-oxidized portions; said pre-oxidized portions being sealed into the bead (12) of hard glass.

7. Method according to claim 1, further comprising providing a wire bridge (14) transverse to the lead-in wires and securing the lead-in wires together in a subassembly;

and wherein said step of introducing the mount into the bulb to extend therein with the bridge (14) outside of the pinch seal (15);

said method further comprising the step of removing the bridge (14) subsequent to the pinch-molding step.

8. Method according to claim 1, further comprising providing a wire bridge (14) transverse to the lead-in wires and securing the lead-in wires together in a subassembly;

and wherein said step of introducing the mount into the bulb comprises introducing the mount into the bulb to extend therein with the bridge (14) outside of the pinch seal (15);

said method further comprising the step of removing the bridge (14) subsequent to the pinch-molding step.

* * * * *

UNITED STATES PATENT AND TRADEMARK OFFICE

CERTIFICATE OF CORRECTION

PATENT NO. : 4,178,050

DATED : December 11, 1979

INVENTOR(S) : Rolf KIESEL

It is certified that error appears in the above-identified patent and that said Letters Patent are hereby corrected as shown below:

Please change Foreign Application Priority Date to:

January 16, 1976

Signed and Sealed this

*Eighth* Day of *July 1980*

[SEAL]

*Attest:*

SIDNEY A. DIAMOND

*Attesting Officer* *Commissioner of Patents and Trademarks*